United States Patent [19]
Morris

[11] 3,759,549
[45] Sept. 18, 1973

[54] COUPLER FOR TRAILER HITCH OR THE LIKE

[76] Inventor: Francis Edwin Morris, 1706 Cherry St., P.O. Box 1002, Wausau, Wis.

[22] Filed: Jan. 24, 1972

[21] Appl. No.: 220,127

[52] U.S. Cl. .............................................. 280/512
[51] Int. Cl. ............................................ B60d 1/06
[58] Field of Search ........................... 280/511, 512

[56] References Cited
UNITED STATES PATENTS

| | | | |
|---|---|---|---|
| 2,292,751 | 8/1942 | Forney | 280/512 |
| 2,407,464 | 9/1946 | Wilson | 280/511 |
| 3,658,363 | 4/1972 | Marler | 280/511 |

Primary Examiner—Kenneth H. Betts
Assistant Examiner—Robert R. Song
Attorney—John W. Michael et al.

[57] ABSTRACT

A heavy duty coupler for a trailer hitch including a standard ball head has semi-spherical socket members hinged together by a vertical pin. One of these socket members has a shank by which the coupler is secured to the tongue of the trailer. The other of the socket members has an extension which in the closed position seats in a recess in the shank. A rotatable locking sleeve has a radially or laterally offset recess which permits the extension to swing outward enough to put the coupler to be placed on or removed from the ball. The walls of the locking sleeve and its radial recess provide a camming surface which as the sleeve is rotated toward locked position helps to force the extension into the recess to easily close the sockets in ball retaining position. A biased locking pin engages with selected notch to keep the sleeve in the locked position. The locking pin has a lever arm by which it can be moved to unlocked position. This lever arm cooperates with a tab-like stop to form a means for locking the coupler against theft.

6 Claims, 4 Drawing Figures

PATENTED SEP 18 1973 3,759,549

COUPLER FOR TRAILER HITCH OR THE LIKE

BACKGROUND OF THE INVENTION

1. Field of the Invention

This invention relates to improvements in heavy duty couplers for trailers and the like and more particularly to a rotative locking sleeve which is in continuous contact with an extension on the swingable semi-spherical socket member and the shank of the fixed semi-spherical socket member to provide a camming action for easily forcing the socket members into ball head locking position.

2. Description of the Prior Art

The most pertinent prior art is shown and described in U.S. Pat. Nos. 1,927,591 and 1,977,065 which utilize a semi-spherical socket fixed by mounting on a shank and a complimentary semi-spherical socket which is hinged by a vertical pin to the fixed semi-spherical socket. The hinged complimentary socket has an extension which in the closed position is held to the shank by a sleeve which is slidable axially along such shank and extension. Other vertical pivot arrangements are shown and described in U.S. Pat. No. 1,810,592. Most of the other prior art patents show a socket fixed to the shank and a locking member swingable about a horizontal pin, see U.S. Pat. Nos.: 2,115,629; 2,204,882; 2,326,466; and 2,723,866.

U.S. Pat. Nos. 3,374,268 and 3,433,503 show the holding of the ball within a socket by rotating a collar with an opening large enough to accept the ball head and small enough in another part to retain the ball head.

Means for locking the coupler against theft when in the closed position is shown in U.S. Pat. Nos.: 2,204,882; 3,139,291; and 3,374,268.

None of the foregoing patents show or teach: (a) the radially rotating sleeve mounted on the shank with a biased locating pin provided with theft proof locking means; (b) a rotative locking sleeve which provides a lock in two convenient positions; and (c) a locking sleeve which includes camming surfaces for easily forcing the semi-spherical sockets to ball head retaining position.

DESCRIPTION OF THE PREFERRED EMBODIMENT

Figure 1:
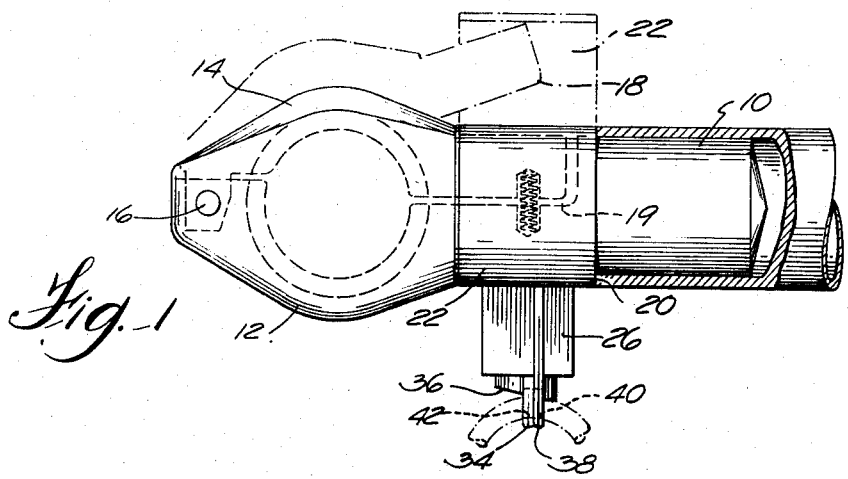
FIG. 1 is a top plan view of the coupler embodying the present invention; the open position of the swingable socket and locking sleeve being shown in broken lines.
Figure 2:
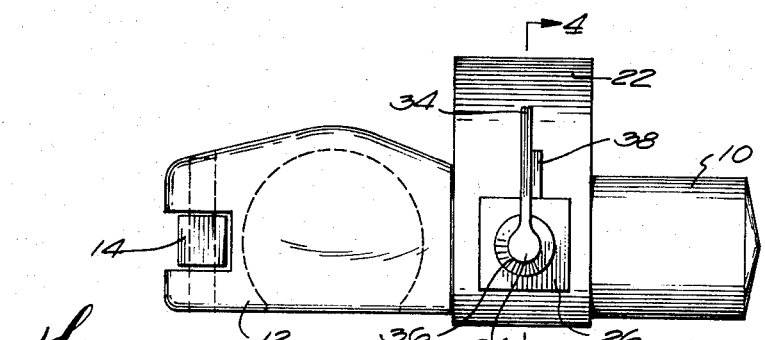
FIG. 2 is a side view of the coupler of FIG. 1.
Figure 4:
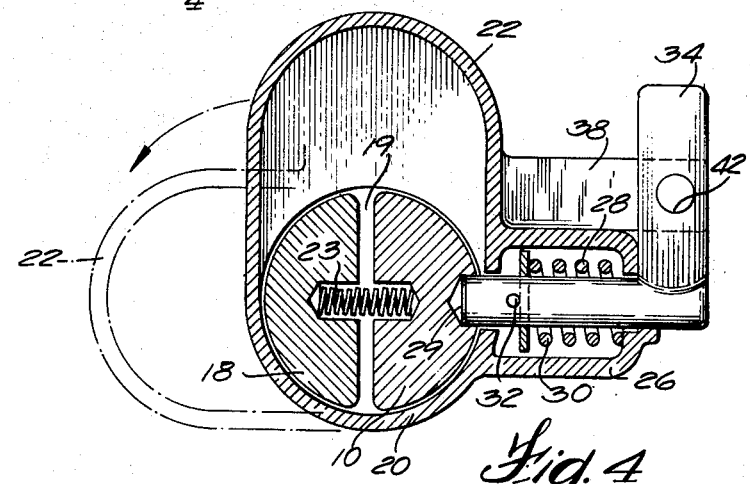
FIG. 4 is a sectional view taken on the line 4—4 of FIG. 1.

Since the coupler disclosed in the drawings has basic elements such as a ball head and the socket members which engage and grip the ball head, which are well known to those skilled in this art, no detailed description of these basic elements will be given.

Referring to the drawings by reference numbers, the essential feature of this invention resides in the use of a rotatable locking sleeve 20 which has a radial or lateral offset recess 22. This sleeve is always maintained in a relatively stationary axial position and as it rotates it permits limited movement of a relatively moveable socket member 14 to a position which will permit the coupling to be inserted on or removed from the ball of the coupling. Another aspect of this type of this rotatable locking sleeve is that the walls of the lateral recess and the walls of the rotatable sleeve form camming surfaces which not only prevent the socket members from becoming moved apart to an excessive extent also provide a camming surface for easily bringing them into a ball locking position.

To illustrate this invention, it is incorporated in a heavy duty coupler for a trailer hitch including a standard ball head not shown. The hitch has a shank 10 which is secured by any mechanical means to the tongue (not shown) of a trailer. This shank has on its outer end a semi-spherical socket member 12 which is integral with the shank 10. The strain from the tractor or other pulling vehicle to the trailer is communicated directly from the socket member 12 to the tongue of the trailer. A complimentary semi-spherical socket member 14 is hinged to the fixed socket member 12 by a vertical pin 16. This socket member 14 has an extension 18 which in the closed position of the socket members as seats in a recess 19 provided as an integral part of the shank 10 and socket member 12. In this closed position of the socket members this extension 18 is held in place by the rotatable locking sleeve 20.

An essential part of the rotatable locking sleeve 20 is the integral provision in it of a radially or laterally offset recess 22. This recess is wide enough in a lateral direction to permit the extension 18 and the socket members 14 to swing about the pin 16 far enough so that the socket members will receive or be withdrawn from the ball head. This open position is shown by the broken lines of FIGS. 1 and 3.

Figure 3:
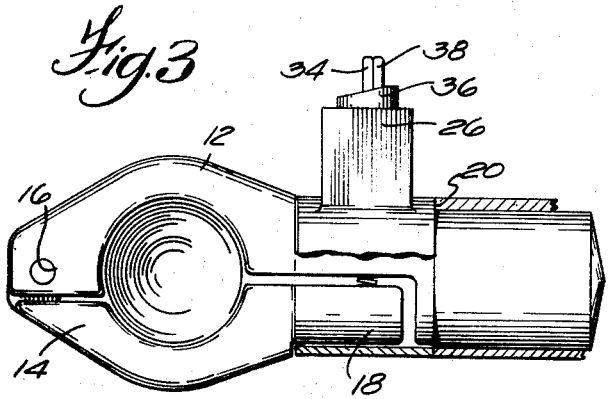
FIG. 3 is a bottom plan view of the coupler of FIG. 1.

When the rotatable locking sleeve 20 is moved to the position shown in the broken lines of FIGS. 1 and 3, the socket member 14 will be swung outwardly with respect to the socket member 12 through the action of a compression spring 23. However it should be noted that the outward movement of the socket member 14 is limited by the dimensional characteristics of the radially offset recess 22 so that the extension 18 will remain in contact with the walls of the rotatable locking sleeve 20 and recess 22. The importance of this is that the relative moveable socket member 14 does not have to be forced into ball head engaging position by any means other than camming action of the locking sleeve 20.

In order to hold the rotatable locking sleeve in either the unlocked or locked position it is provided with an open-sided housing 26 in which is mounted a locking pin 24. The pin 24 is biased inwardly by a compression spring 28 acting between a wall of the housing 26 and a washer 30 on the locking pin. The washer 30 is held against axial movement along the pin by a taper pin 32. On the outer end of the locking pin 24 there is provided a lever arm 34 by which such pin may be moved axially outward or rotated. Upon rotation the lever 34 rides on a cam surface 36 which moves the locking pin 24 axially outward so that its inner end is removed from a locking notch 29.

Another feature of this invention is that the rotation of the lever 34 to the locked position of the pin 24 is stopped by a tab or stop arm 38 on the sleeve 22. In the stopped position, openings 40 and 42 in the lever 34 and tab 38 will be aligned so that a padlock may be inserted through them to lock the pin 24 in the locked position to prevent unlawful opening of the coupler.

The essential features of this invention therefore reside in the use of the rotatable locking sleeve as compared with an axially sliding locking sleeve; the provision of a camming action to bring the socket members into proper ball engaging position with a minimum of force and without the necessary use of hammers and other types of closing mechanisms.

I claim:

1. A coupler for a trailer hitch comprising:
  a. a pair of hinged semi-spherical socket members; one of said socket members having an extension receiving recess opposite to the hinged portion thereof with respect to the ball receiving socket and a shank adapted to be rigidly secured to a trailer tongue; the other of said socket members having an extension which in the closed position of said socket members is received in said recess; and
  b. a rotatable locking sleeve mounted on said shank rotatively enveloping said extension and said receiving recess and having a laterally offset recess which permits said extension in the open position of said sleeve to swing outwardly a sufficient amount to open said socket members to allow the insertion or retraction of a ball head.

2. A trailer hitch as defined in claim 1 wherein:
said locking sleeve and said offset recess are in continuous engagement with said extension to restrict the apart swinging of said socket members.

3. A trailer hitch as defined in claim 2 wherein:
the walls of said offset recess and said locking sleeve form a camming surface to force said extension into said extension receiving recess upon rotation of said sleeve from open to closed positions thereof.

4. A trailer hitch as defined in claim 1 wherein:
said locking sleeve is provided with an inwardly biased locking pin to hold it in closed position with said offset recess out of alignment with said extension and in open position with said offset recess in alignment with said extension.

5. A trailer hitch as defined in claim 4 wherein:
  a. said locking pin is provided with a lever arm for rotating said pin; and
  b. a camming surface is mounted on said locking sleeve to outwardly axially move said locking pin upon rotation of said lever arm.

6. A trailer hitch as defined in claim 5 wherein;
  a. said locking sleeve has a tab-like stop engageable by said lever arm to restrict the turning of said lever arm at the open position of said locking sleeve; and
  b. said stop and lever arm have openings to receive a padlock.

* * * * *